US012789719B2

(12) United States Patent
Buendia Moreno et al.

(10) Patent No.: US 12,789,719 B2
(45) Date of Patent: Nov. 10, 2026

(54) VEHICLE MODULAR ORGANIZER ASSEMBLY FOR STORAGE COMPARTMENT

(71) Applicant: Ford Global Technologies, LLC, Dearborn, MI (US)

(72) Inventors: Carlos Buendia Moreno, Mexico City (MX); Alejandro Garnica Izzo, Mexico City (MX); Bernardo Quintero, Atizapán de Zaragoza (MX); Sebastien Raymond Brunereau, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 18/922,742

(22) Filed: Oct. 22, 2024

(65) Prior Publication Data

US 2026/0109303 A1 Apr. 23, 2026

(51) Int. Cl.
*B60R 13/01* (2006.01)
*B60R 5/02* (2006.01)

(52) U.S. Cl.
CPC .............. *B60R 13/013* (2013.01); *B60R 5/02* (2013.01)

(58) Field of Classification Search
CPC .............. B60R 13/013; B65D 21/0201; B65D 21/0202; B65D 21/0204; B65D 21/0223; B60P 1/6418; B60P 1/6481; B60P 1/64
USPC ................ 224/542, 544, 543; 220/23.2, 23.4
See application file for complete search history.

(56) References Cited

U.S. PATENT DOCUMENTS

| | | | | |
|---|---|---|---|---|
| 3,131,829 | A * | 5/1964 | Masser | B65D 21/0204 217/65 |
| 4,522,442 | A * | 6/1985 | Takenaka | B62K 19/46 180/215 |
| 5,433,416 | A * | 7/1995 | Johnson | B65D 23/003 403/381 |
| 5,934,532 | A * | 8/1999 | Rausch | B60R 7/04 224/543 |
| 7,097,224 | B2 * | 8/2006 | Lester | B60R 9/00 224/404 |
| 9,500,400 | B2 * | 11/2016 | Smith | F25D 23/028 |
| 9,630,562 | B2 | 4/2017 | Nedelman | |
| 10,112,545 | B1 * | 10/2018 | Gaskins | B60R 9/065 |

(Continued)

FOREIGN PATENT DOCUMENTS

| | | | |
|---|---|---|---|
| DE | 102022125257 | A1 | 4/2024 |
| KR | 102273991 | B1 | 7/2021 |
| KR | 102440831 | B1 | 9/2022 |

*Primary Examiner* — Corey N Skurdal
(74) *Attorney, Agent, or Firm* — Vichit Chea; Price Heneveld LLP

(57) ABSTRACT

A modular compartment organizer assembly for use in a vehicle compartment has a box having front and rear walls and left and right side walls defining one or more compartments. The box further has a plurality of vehicle connector features located near an open top end on the rear wall and configured to secure onto a plurality of box connector features on a supporting structure in the vehicle compartment on the vehicle. A tray in the box defines one or more storage trays. The tray has a rear wall comprising a plurality of tray connector features. A plurality of tray connector features are configured to engage the plurality of box connector features on the front wall of the box such that the tray may be secured to the box and removed from the box.

19 Claims, 4 Drawing Sheets

(56) References Cited

U.S. PATENT DOCUMENTS

| | | | | |
|---|---|---|---|---|
| 10,814,794 | B1 * | 10/2020 | Jadhav | B60R 9/065 |
| 11,142,129 | B2 | 10/2021 | Howard, II et al. | |
| 11,414,018 | B2 * | 8/2022 | Kraus | B60R 5/04 |
| 12,503,027 | B2 * | 12/2025 | McCormick | B60N 3/103 |
| 2007/0241154 | A1 | 10/2007 | Potts et al. | |
| 2013/0277366 | A1 * | 10/2013 | Paculdo | B65D 25/04 220/500 |
| 2022/0185192 | A1 * | 6/2022 | Gill | B60R 11/06 |
| 2023/0263307 | A1 * | 8/2023 | LaViolette | A47C 3/16 5/653 |
| 2026/0029172 | A1 * | 1/2026 | Alexander | B60H 1/0025 |

* cited by examiner

VEHICLE MODULAR ORGANIZER ASSEMBLY FOR STORAGE COMPARTMENT

FIELD OF THE DISCLOSURE

The present disclosure generally relates to motor vehicles configured with storage compartments, and more particularly relates to a modular storage compartment assembly that may be utilized in a vehicle compartment such as a front trunk.

BACKGROUND OF THE DISCLOSURE

Motor vehicles are commonly equipped with storage compartments. For example, some vehicles such as sedans may include a rear trunk. In addition, electric vehicles commonly include a front trunk storage area referred to as a frunk. It may be desirable to provide for a modular storage compartment assembly that provides for enhanced organization and efficient use of a vehicle compartment.

SUMMARY OF THE DISCLOSURE

According to a first aspect of the present disclosure, a modular compartment organizer assembly for use in a vehicle compartment has a box having front and rear walls and left and right side walls defining one or more compartments. The box further has a plurality of vehicle connector features located near an open top end on the rear wall and configured to secure onto a plurality of box connector features on a supporting structure in the vehicle compartment on the vehicle. A tray in the box defines one or more storage trays. The tray has a rear wall comprising a plurality of tray connector features. A plurality of tray connector features are configured to engage the plurality of box connector features on the front wall of the box such that the tray may be secured to the box and removed from the box.

Embodiments of the first aspect of the present disclosure can include any one or a combination of the following features:

- the plurality of box connector features comprises first and second box connector features spaced apartment;
- the first and second box connector features each comprise a U-shaped portion for engaging a U-shaped slot on the vehicle structure;
- the plurality of tray connector features comprises first and second tray connector features spaced apartment;
- the first and second tray connector features each comprise a U-shaped portion for engaging a U-shaped slot on the vehicle structure;
- the box comprises a plurality of box compartments;
- the box comprises first, second and third box compartments;
- the plurality of tray connector features may be connected to the plurality of box connector features on the vehicle structure when the box is not connected to the vehicle structure;
- a lid configured to cover at least a portion of the box and the tray; and
- the vehicle compartment comprises a frunk.

According to a second aspect of the present disclosure, a motor vehicle has a frunk located generally at the front end of the motor vehicle. A supporting structure is provided in the frunk having first and second receiving features. The motor vehicle also includes a modular compartment organizer assembly for use in a vehicle compartment has a box having front and rear walls and left and right side walls defining one or more compartments. The box further has a plurality of vehicle connector features located near an open top end on the rear wall and configured to secure onto a plurality of box connector features on a supporting structure in the vehicle compartment on the vehicle. A tray in the box defines one or more storage trays. The tray has a rear wall comprising a plurality of tray connector features. A plurality of tray connector features are configured to engage the plurality of box connector features on the front wall of the box such that the tray may be secured to the box and removed from the box.

Embodiments of the second aspect of the present disclosure can include any one or a combination of the following features:

- the plurality of box connector features comprises first and second box connector features spaced apartment;
- the first and second box connector features each comprise a U-shaped portion for engaging a U-shaped slot on the vehicle structure;
- the plurality of tray connector features comprises first and second tray connector features spaced apartment;
- the first and second tray connector features each comprise a U-shaped portion for engaging a U-shaped slot on the vehicle structure;
- the box comprises a plurality of box compartments;
- the box comprises first, second and third box compartments;
- the plurality of tray connector features may be connected to the plurality of box connector features on the vehicle structure when the box is not connected to the vehicle structure;
- a lid configured to cover at least a portion of the box and the tray; and
- the vehicle compartment comprises a frunk.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
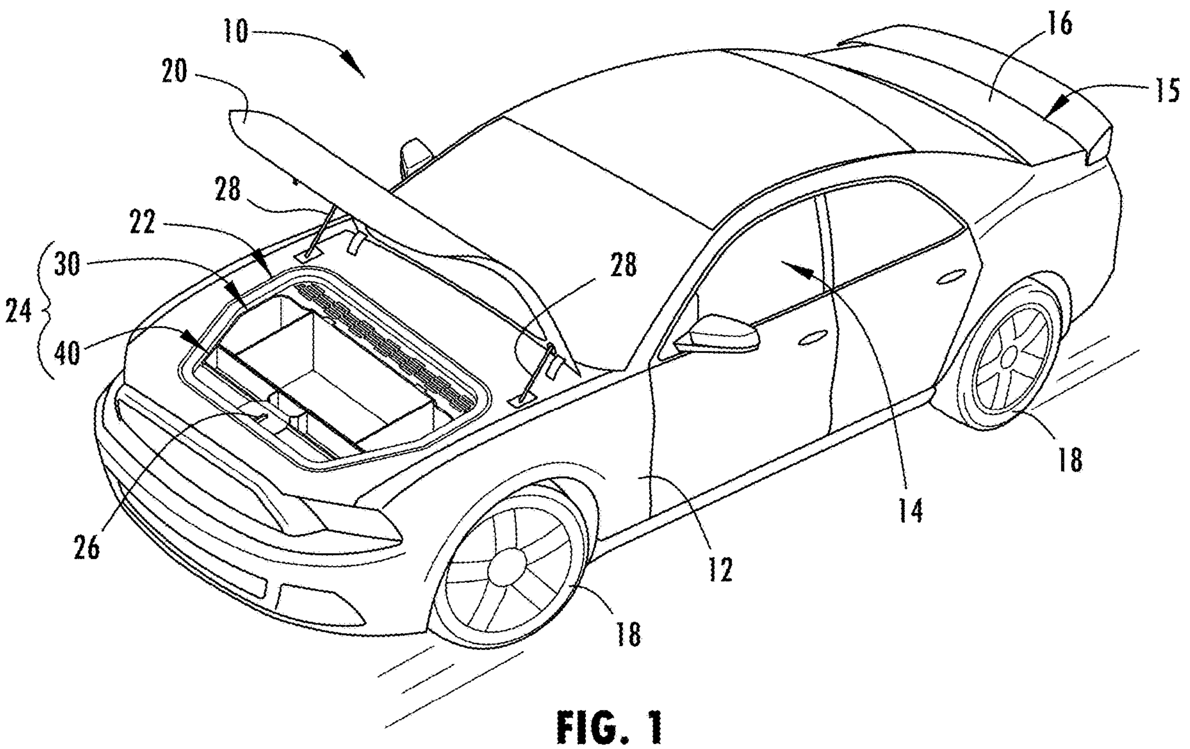
FIG. 1 is a front upper perspective view of a motor vehicle having a frunk storage compartment equipped to receive a modular storage organizer assembly, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle storage compartment organizer assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, an automotive or motor vehicle 10 is generally illustrated having a modular compartment organizer assembly 24 installed in a front trunk, also referred to herein as a frunk 22, at the front end of the motor vehicle 10. The motor vehicle 10 generally includes a vehicle body 12 which may include body panels, doors, a roof, a floor and windows, generally defining a cabin interior 14, also referred to as a passenger compartment. The cabin interior 14 generally includes seating assemblies for seating one or more passengers and a driver of the motor vehicle 10. The motor vehicle 10 shown and described herein is a wheeled motor vehicle having a plurality of tire and wheel assemblies 18. In one example, the motor vehicle 10 shown and described herein is a sedan style vehicle, however, it should be appreciated that the motor vehicle 10 may be a truck, a sport utility vehicle (SUV), a van, a bus or other motor vehicle configured with an accessible compartment capable of receiving the modular compartment organizer assembly 24.

The motor vehicle 10 includes a rear trunk 15, generally rearward of the passenger compartment, at the rear end of the motor vehicle 10 which typically includes a trunk lid 16 that covers a storage compartment of the rear trunk 15 which is available for storing cargo items. In addition, the motor vehicle 10 has the front trunk or frunk 22 at the front end of the motor vehicle 10, generally forward of the passenger compartment. The frunk 22 defines a storage compartment and includes a hood panel 20 which may move between a closed position concealing the frunk 22 and an open position supported open by support arms 28 that exposes the frunk 22 and allows access to the frunk 22 and cargo items contained therein. In the closed position, the frunk hood panel 20 is latched and conceals cargo items that are stored in the frunk 22. In the open position, a user may place and access cargo items stored within the frunk 22.

Figure 3:
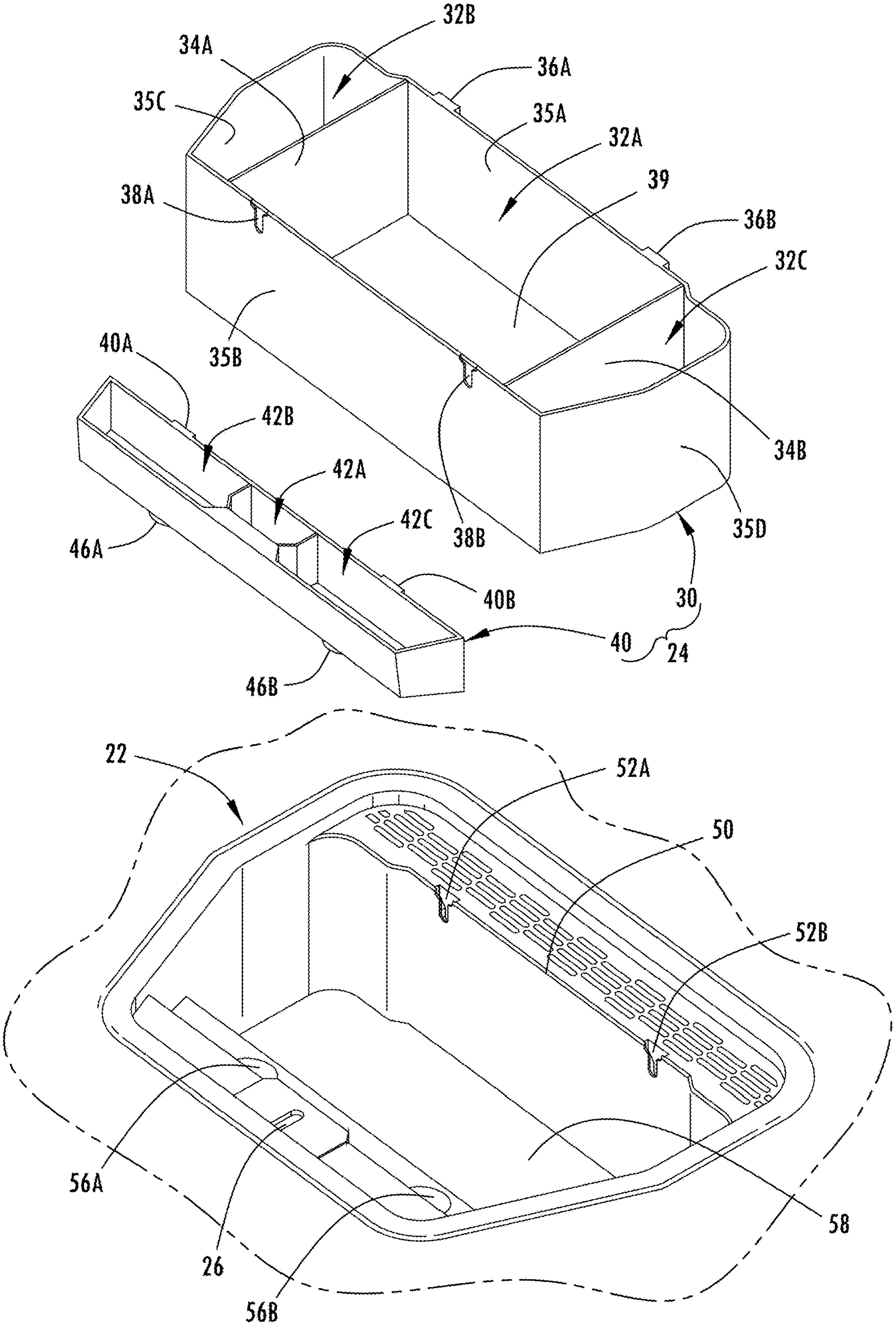
FIG. 3 is an exploded view of the frunk storage compartment with the modular storage organizer assembly as shown in FIG. 2.

The motor vehicle 10 may be a battery electric vehicle (BEV) in one example that employs battery packs for powering one or more electric motors to power and drive the motor vehicle 10. In a battery electric vehicle, the frunk 22 has additional space generally available due to the lack of an internal combustion engine, for example. The frunk 22 thereby has an expanded available cargo storage space which includes a rear wall 50 and sidewalls generally defining the upstanding portions of the frunk 22 and a bottom 58 as shown in FIG. 3. It should be appreciated that the motor vehicle 10 may otherwise be configured with an internal combustion engine or as a hybrid vehicle having one or more storage compartments configurable to receive the modular compartment organizer assembly 24.

Figure 2:
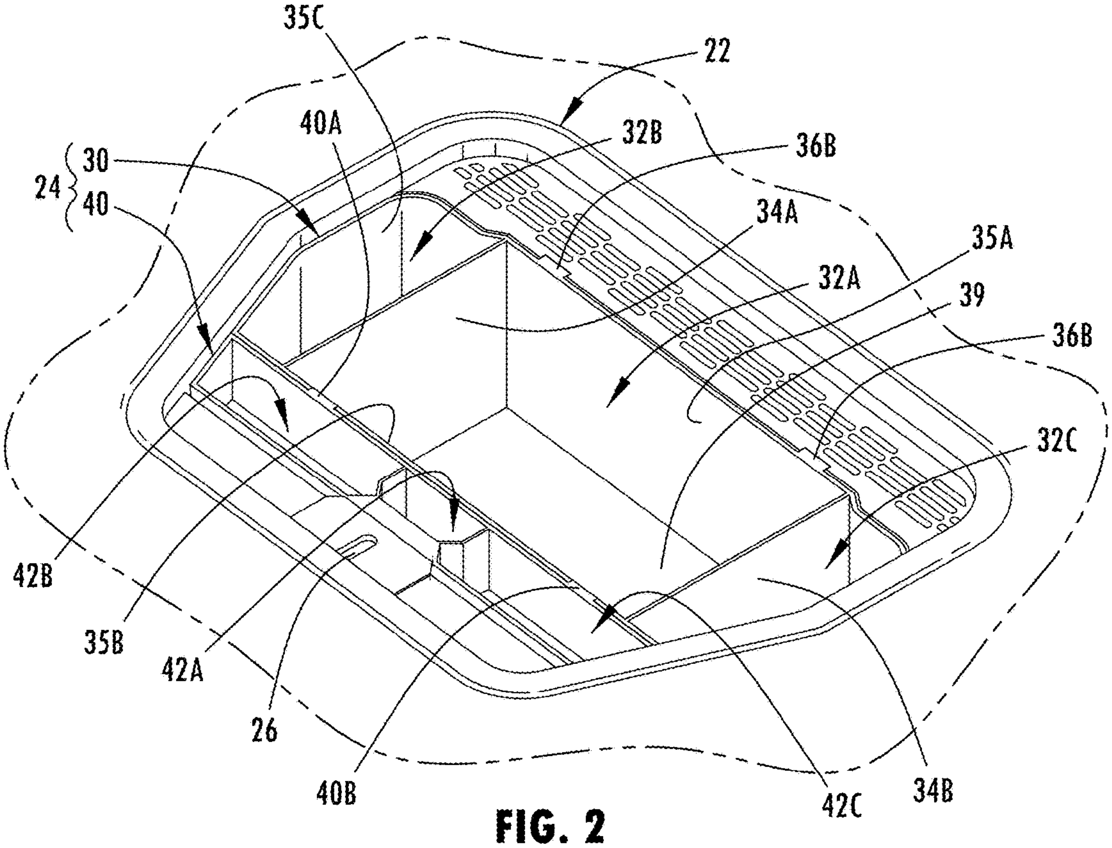
FIG. 2 is an enlarged upper perspective view of the frunk storage compartment with the modular storage organizer assembly arranged therein.

The rear wall 50 and sidewalls forming the frunk 22 are generally configured to receive the modular compartment organizer assembly 24 as shown in FIG. 2. The modular compartment organizer assembly 24 is further illustrated in FIGS. 3, 4 and 5 having a box 30 configured with a wall 35A, a front wall 35B, a right side wall 35C and a left sidewall 35D defining one or more box compartments. The box 30 further includes a plurality of box connector features, including spaced apart first and second box connector features 36A and 36B, located near an open top end on the rear wall and configured to matingly engage and be secured on a supporting structure in the frunk 22 compartment in the motor vehicle 10. As seen in FIG. 3, the first and second box connector features 36A and 36B are configured to engage and be retained on a plurality of vehicle connector features including spaced apart first and second vehicle connector features 52A and 52B formed in the upper portion of wall 50 of the frunk 22.

Figure 4:
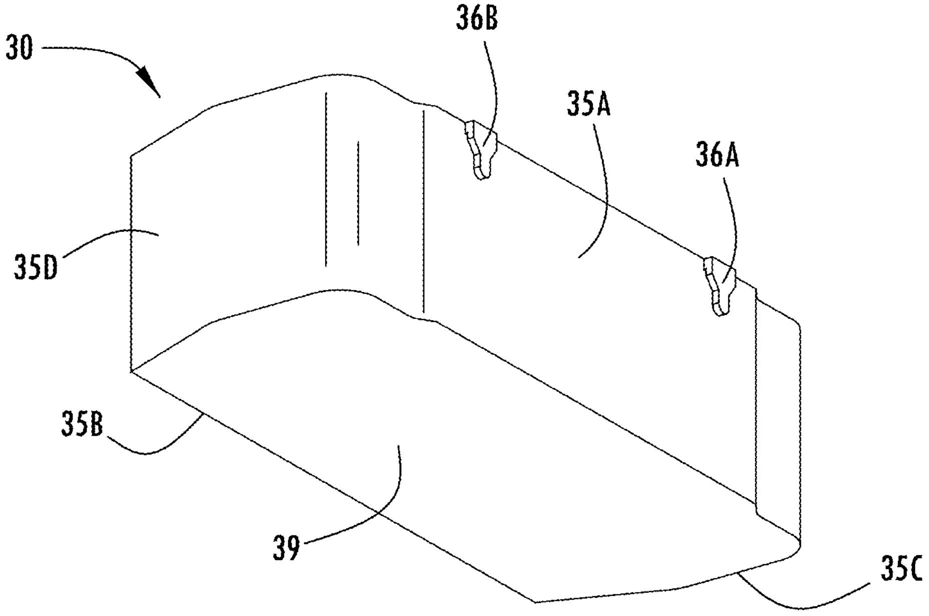
FIG. 4 is a lower rear perspective view of a box of the modular compartment organizer assembly.
Figure 5:
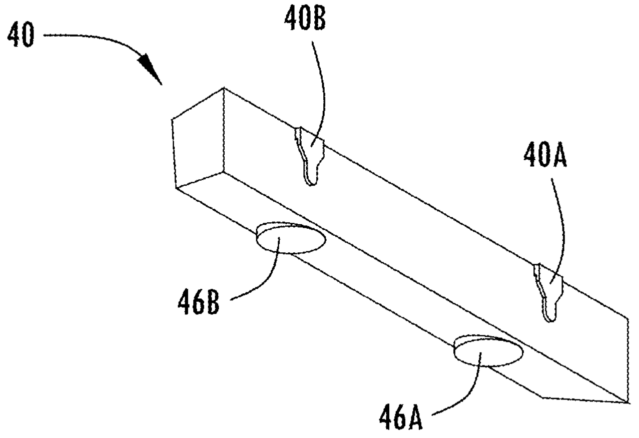
FIG. 5 is a lower perspective view of a tray of the modular storage organizer assembly.

The first and second box connector features 36A and 36B may each include an outward protruding male member having a generally U-shaped lower portion expanding into a wider U-shaped upper portion as seen in FIG. 4. The first and second vehicle connector features 52A and 52B each include a similarly shaped female receiving channel having a lower U-shaped portion extending into a wider upper U-shaped portion on the top. The first and second box connector features 36A and 36B are configured with a shape and size to matingly fit within and be retained within the first and second vehicle connector features 52A and 52B, respectively, to retain and support the box 30 on the wall 50 within the frunk 22 storage compartment. The first and second connector features 36A and 36B may have an outer facing size greater than an inner facing size so that they are held in the respective first and second vehicle connector features 52A and 52B.

The box 30 includes a plurality of compartments, according to one example. The box 30 includes a first central box compartment 32A, a second end box compartment 32B at one end, and a third end box compartment 32C at the opposite end. The first central box compartment 32A is larger than the second and third end box compartments 32B and 32C. As such, each of the first, second and third box compartments 32A, 32B and 32C are defined by separate first and second dividers 34A and 34B and are configured to store cargo items of different shapes and sizes. It should be appreciated that the box 30 may include any of a number of one or more box compartments having any of a number of shapes and sizes.

The modular compartment organizer assembly 24 further includes a tray 40 defining one or more storage tray compartments and having a rear wall comprising a plurality of tray connector features shown including first and second tray connector features 40A and 40B. The first and second tray connector features 40A and 40B are configured to matingly engage and be secured onto third and fourth box connector features 30A and 30B on the top edge of the front wall 35B of the box 30, such that the tray 40 may be removably attached to the box 30. The tray connector features 40A and 40B each may include an outward protruding male member having a generally U-shaped lower portion and an enlarged upper U-shaped portion that fits within likewise configured third and fourth receiving box connector features 38A and 38B which each have a female receiving channel with a generally U-shaped lower portion and an enlarged upper U-shaped portion. The first and second tray connector features 40A and 40B may have an outer facing size greater than an inner facing size so that they are held in the respective third and fourth female box connector features 38A and 38B. As such, the first and second tray connector features 40A and 40B are configured to fit within the third and fourth box connector features 38A and 38B, respectively, on the box 30 to retain and support the tray 40 in place on the front side of the box 30.

The tray 40 is also configured to connect directly onto the upper portion of the rear wall 50 of the frunk 22 when the box 30 is not connected to the wall 50. This is achieved by connecting the first and second tray connector features 40A and 40B directly onto the first and second vehicle connector features 52A and 52B.

The tray 40 is shown in one example having a plurality of trays. Specifically, the tray 40 includes a first central tray compartment 42A, a second tray compartment 42B at one end, and a third tray compartment 42C at the opposite end. It should be appreciated that the tray 40 may include one or more storage compartment trays. In addition, the bottom of tray 40 includes first and second support bases 46A and 46B which are configured to fit within cup holder shaped portions 56A and 56B within the front portion of the storage compartment 22 as seen in FIG. 3. As such, portions 46A and 46B provide lower front support or stability to support the tray 40 from underneath while assembled within the storage compartment 22.

Figure 6:
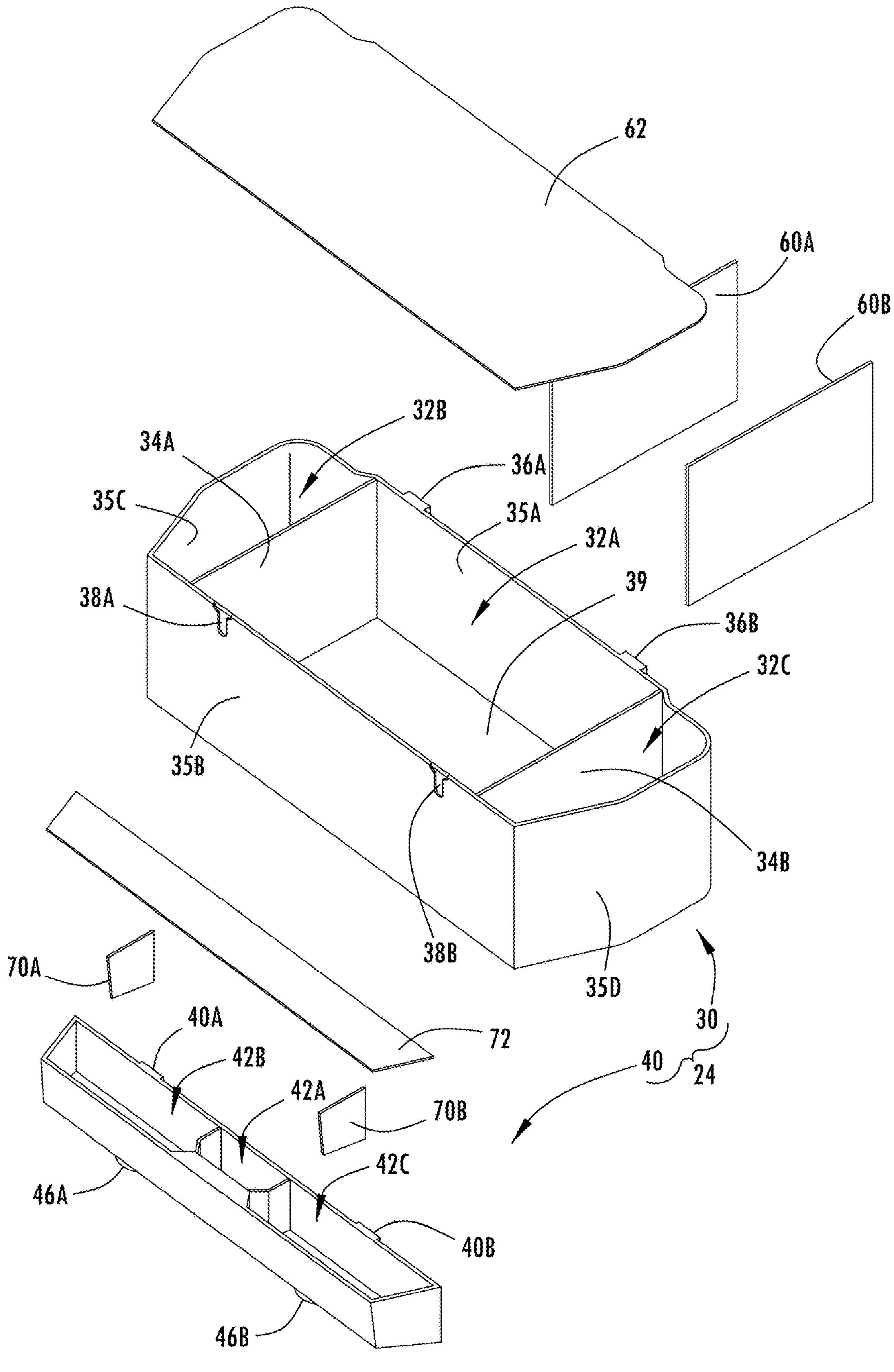
FIG. 6 is an exploded view of a modular storage organizer assembly having dividers and lids, according to one embodiment.

The modular compartment organizer assembly 24 is further illustrated in FIG. 6 having additional dividers shown as first and second dividers 60A and 60B disposed within the main compartment 32A. It should be appreciated that any one of the storage compartments 32A, 32B and 32C may include divider members to further divide the storage compartments into specific size and shape compartments. The dividers 60A and 60B may be inserted as desired and removed to adjust the number, shape and size of the compartments. Additionally, tray 40 is shown having dividers 70A and 70B located within storage compartment trays 42B and 42C so as to divide the tray compartments into smaller tray compartments. It should be appreciated that the tray 40 may likewise include any of a number of dividers to divide the tray compartments into any of a number of tray compartments.

In the embodiment shown in FIG. 6, the box 30 is further shown having a lid or cover 62 configured to fit over the top open end of the box 30 to cover the top open end thereof. It should be appreciated that one or more lids or covers may be employed on the box 30 to cover the entire box or portions of the box, such as the individual compartments. Additionally, tray 40 is shown having a lid or cover 72 disposed over the top thereof to close the tray 40. It should be appreciated that the tray 40 may likewise include one or more lid or cover to close the individual compartments.

Accordingly, the modular compartment organizer assembly 24 may advantageously be used in a storage compartment on a motor vehicle 10, such as in the frunk 22 of the vehicle 10, to provide efficient and enhanced storage of cargo items in an organized manner. It should be appreciated that while the first and second box connector features 36A and 36B and the first and second tray connector features 40A and 40B are described herein as U-shaped male members configured to be secured in U-shaped female members for the first and second vehicle connector features 52A and 52B and third and fourth box connector features 38A and 38B, other male and female connector features may be employed and the male and female connector features may be switched so that the male and female connector features may be on either of the connecting parts.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A modular compartment organizer assembly for use in a vehicle compartment on a vehicle, the modular compartment organizer comprising:

a box having front and rear walls and left and right side walls defining one or more compartments, the box further comprising a first plurality of box connector features on the rear wall of the box and located near an open top end on the rear wall and configured to secure onto a plurality of vehicle connector features on a supporting structure in the vehicle compartment on the vehicle, and a second plurality of box connector features on the front wall of the box and located near the open top end of the front wall; and a tray defining one or more storage trays, the tray further having a rear wall comprising a plurality of tray connector features, wherein the plurality of tray connector features are configured to engage the second plurality of box connector features on the front wall of the box such that the tray may be secured to the box and removed from the box.

2. The vehicle compartment organizer assembly of claim 1, wherein the first plurality of box connector features comprises first and second box connector features spaced apart.

3. The vehicle compartment organizer assembly of claim 2, wherein the first and second box connector features each comprise a U-shaped portion for engaging a U-shaped slot on the vehicle structure.

4. The vehicle compartment organizer of claim 1, wherein the plurality of tray connector features comprises first and second tray connector features spaced apart and configured to engage third and fourth box connector features of the second plurality of box connector features.

5. The vehicle compartment organizer assembly of claim 4, wherein the first and second tray connector features each comprise a U-shaped portion for engaging a U- shaped slot on the third and fourth box connector features.

6. The vehicle compartment organizer assembly of claim 1, wherein the box comprises a plurality of box compartments.

7. The vehicle compartment organizer assembly of claim 6, wherein the box comprises first, second and third box compartments.

8. The vehicle compartment organizer assembly of claim 1, wherein the plurality of tray connector features may be connected to the plurality of vehicle connector features on the vehicle structure when the box is not connected to the vehicle structure.

9. The vehicle compartment organizer assembly of claim 1, further comprising a lid configured to cover at least a portion of the box and the tray.

10. The vehicle compartment organizer of claim 1, wherein the vehicle compartment comprises a frunk.

11. A motor vehicle comprising:

a frunk located generally at a front end of the motor vehicle;

a supporting structure provided in the frunk and having a plurality of vehicle connector features; and a modular compartment organizer assembly for use in a vehicle compartment on the vehicle, the modular compartment organizer assembly comprising:

a box having front and rear walls and left and right side walls defining one or more compartments, the box further comprising a first plurality of box connector features on the rear wall of the box and located near an open top end on the rear wall and configured to secure onto the plurality of vehicle connector features on the supporting structure in the frunk, and a second plurality of box connector features on the front wall of the box and located near the open top end of the front wall; and a tray defining one or more storage trays, the tray further having a rear wall comprising a plurality of tray connector features, wherein the plurality of tray connector features are configured to engage the second plurality of box connector features on the front wall of the box such that the tray may be secured to the box and removed from the box.

12. The motor vehicle of claim 11, wherein the first plurality of box connector features comprises first and second box connector features spaced apart.

13. The motor vehicle of claim 12, wherein the first and second box connector features each comprise a U-shaped portion for engaging a U-shaped slot on first and second vehicle connecting features of the plurality of vehicle connecting features.

14. The motor vehicle of claim 11, wherein the plurality of tray connector features comprises first and second tray connector features spaced apart and configured to engage third and fourth box connector features of the second plurality of box connector features.

15. The motor vehicle of claim 14, wherein the first and second tray connector features each comprise a U-shaped portion for engaging a U-shaped slot on the third and fourth box connector features.

16. The motor vehicle of claim 11, wherein the box comprises a plurality of box compartments.

17. The motor vehicle of claim 16, wherein the box comprises first, second and third box compartments.

18. The motor vehicle of claim 11, wherein the plurality of tray connector features may be connected to the plurality of vehicle connector features on the vehicle structure when the box is not connected to the vehicle structure.

19. The motor vehicle of claim 11, further comprising a lid configured to cover at least a portion of the box and the tray.

* * * * *